Aug. 17, 1926.
W. E. DIEGEL
1,596,005
ANIMAL TRAP
Filed July 27, 1925
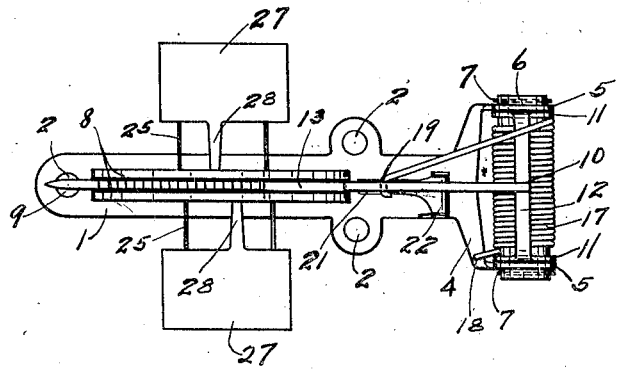
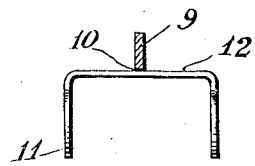
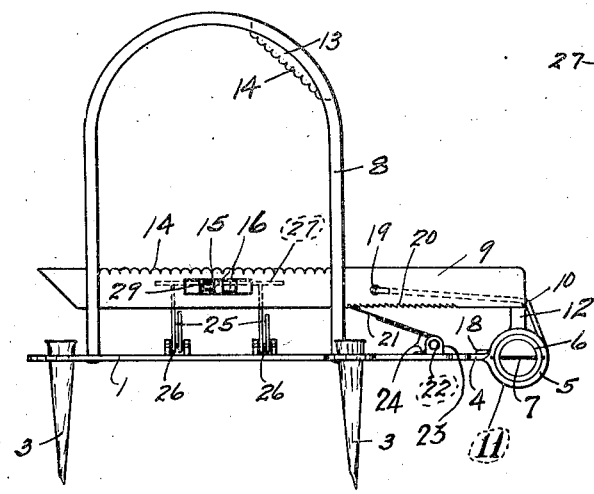
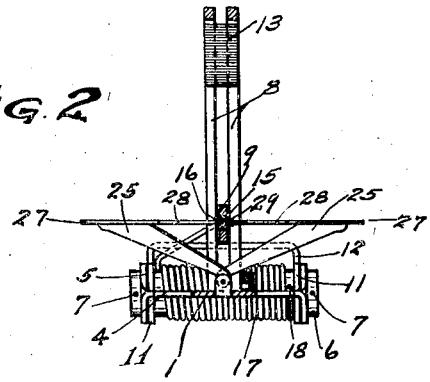
Inventor
Wilfrid E. Diegel.
By Adam E. Fisher.
Attorney Patented Aug. 17, 1926.

1,596,005

UNITED STATES PATENT OFFICE.

WILFRID E. DIEGEL, OF RIVER ROUGE, MICHIGAN.

ANIMAL TRAP.

Application filed July 27, 1925. Serial No. 46,295.

This invention is an animal trap for catching animals of any kind; and the main object of the invention is to provide a trap in a simple, strong and practical form of construction, and adapted to hold the animal, when caught, in a sure and positive grip, and so as to not injure the fur of the animal.

Another object is to provide a trap having trigger or trap springing elements located on either side of the trap and in the path of the animal, the said trigger elements being cooperatively interdependent in such a manner that both of the triggers must be operated before the trap can be sprung, whereby the animal is caught by the trap arm at the mid-point of its travel through the trap.

Other objects and advantages will appear in the course of this specification, reference being had to the accompanying drawing, wherein Figure 1 is a top or plan view;
Figure 2 is an end elevation;
Figure 3 is a side elevation;
Figure 4 is a detail of the trap arm pivot bar, showing a section of the attached trap arm.

In carrying out this invention an elongated base 1 is provided, and is positioned horizontally, the same having a number of anchor holes 2 formed therein to facilitate fastening the trap to the ground by means of stakes or staples 3 driven therethrough into the ground. One end of the base 1 is widened and formed into a fork 4, the ends of this fork being shaped into rings 5, the planes of which extend perpendicularly to the base and parallel to the axis thereof. A U-shaped trap arm pivot bar 12 is formed with rings 11 extended in parallel relation at each end. These rings 11 are of the same inner diameter as the rings 5 and are adapted to fit at the inner faces of the rings 5, the bar 12 being made of an appropriate length for this purpose. A tubular shaft 6 is passed through the rings 5 and 11 and is held in place by pins 7 through the extended ends of the shaft. Two trap rings 8 are rigidly mounted at the end of the base 1 oppositely to the fork 4, these rings being spaced slightly apart, positioned perpendicularly to the base and with their planes parallel to the axis of the base. A long, flat trap arm 9 is fastened rigidly at 10 to the center of the bar 12, the forward end of the arm being extended between the two trap rings 8. The trap rings 8 are joined at their upper portions by means of the connecting strip 13, the extended axial line of which passes through the point 10 on the bar 12. The lower edge of the strip 13 and the upper edge of the cooperating section of the arm 9 is serrated as shown at 14 to facilitate the gripping of the animal. A slot 15 is cut through the arm 9 and two trigger rollers 16 are journaled therein on axes parallel to the axis of the arm 9. A coil trap spring 17 encircles the tubular shaft 6 beneath the bar 12, one end of the spring being attached at 18 to the base 1, and the other end being brought up over and attached at 19 to the arm 9. The mounting and setting of the spring 17 is such as to normally throw the arm 9 upwardly and hold it strongly up against the connecting strip 13. An arm locking mechanism is provided, consisting in serrating the lower edge of the arm 9, adjacent its pivoted end, as shown at 20, and then mounting a spring set detent 21 upon the base 1, in such manner that the bit of the detent will be normally held in contact with the serrations or teeth 20, thereby locking the arm 9 at any point of its upward travel. For this purpose the detent 21 is pivoted at 22 between the lugs 23 secured to the base 1, and a spring 24 is coiled around the pivot 22 and braced between the base 1 and the detent 21. The pivot 22 being in advance of the attachment point 10 of the arm 9, the action of the detent is of course to hold the arm 9 at any point of elevation to which it may be raised. Tread board supporting arms 25 are hinged at 26 to the base 1, in transverse alignment with the rollers 16. There are two pairs of these arms 25 and one pair is mounted at each side of the base 1 opposite one of the rollers 16, as stated, and they are adapted to move in planes perpendicular and transverse to the axis of the base 1. Tread boards 27 are mounted upon the ends of the arms 25 and at such angles relative to the arms that when the outer ends of the arms are elevated at angles of approximately 30 degrees from the base, the planes of the said tread boards 27 will extend horizontally and will approximately coincide. At the same time the elevational mounting of the arm 9 above the base 1 should be such, that the rollers 16 will also fall approximately in the same horizontal plane with the tread boards 27. Stiff flat fingers 28 are extended inwardly from the two tread boards 27, and the inner ends thereof are curved to form triggers 29 adapted to pass through the slot 15 and engage the rollers 16 at their upper sides.

The trap is set by releasing the detent 21 and pressing the arm 9 down to its horizontal position. The arms 25 and boards 27 are then raised, which action results in the triggers 29 being thrust through the slot 15 over the rollers 16, whereby the arm 9 is held in its depressed position. It is also obvious that either one of the triggers 29 is sufficient to hold the arm 9 in its lowered position. The trap being so set, as the animal passes upon it from either side, his weight upon the tread board at that side withdraws the trigger 29 at that side from its roller; but the trap is not sprung until the animal passes on over the base 1 and its weight falls also upon the other tread board. When this occurs the opposite trigger 29 is also withdrawn from its roller, and the arm 9 is then free to fly upward under the action of the strong spring 17. The animal is carried upward on the arm and is pressed up against the rings 8 and the strip 13, where the animal is securely held.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

I claim:

1. In a device of the kind described, a flat, elongated base having a forked end, the extremities thereof being formed into rings extended perpendicular to the base and parallel to the axis thereof and to each other; a U-shaped trap arm pivot bar formed with end rings extended in parallel relation and adapted to align with and fit at the inner faces of the rings of the forked end of the base; a tubular shaft passed through the said aligned rings; and a trap arm rigidly attached at one end to the said trap arm pivot bar.

2. In a device of the kind described, a flat, elongated base having a forked end, the extremities thereof being formed into rings extended perpendicular to the base and parallel to the axis thereof and to each other; a U-shaped trap arm pivot bar formed with end rings extended in parallel relation and adapted to align with and fit at the inner faces of the rings of the forked end of the base; a tubular shaft passed through the said aligned rings; a trap arm rigidly attached at one end to the said trap arm pivot bar; and a coil trap spring encircling the said tubular shaft, one end of the spring being attached to the base and the other end to the said trap arm, the said spring being adapted normally to throw the trap arm upwardly.

3. In a device of the kind described, a flat, elongated base having spaced and parallel rings extended from one end; a U-shaped trap arm pivot bar having spaced and parallel end rings adapted to register with and fit at the inner faces of the base rings, a tubular shaft passed through the said aligned rings; a trap arm rigidly attached at one end to the said trap arm pivot bar, the said trap arm being serrated along its lower edge adjacent its attached end; and a spring set detent mounted upon the base and normally adapted to engage the said serrations of the trap arm to lock the trap arm at any point of its upward travel.

4. In a device of the kind described, a flat, elongated base; a spring set trap arm pivotally attached at one end of the base and normally adapted to move upwardly from the base in the plane passing through the axis of the base, the said trap arm having a slot cut through its free end; two trigger rollers journaled in the said slot on axes parallel to the axis of the arm; tread board supporting arms hinged to the base at each side of the said trap arm and in approximate transverse alignment; tread boards mounted upon the free ends of the said supporting arms, at such angles relative thereto that when the outer ends of the arms are elevated at substantial angles, the planes of the said tread boards will extend horizontally and will approximately coincide with the horizontal plane passing through the said trigger rollers; fingers extended inwardly from the said tread boards, the inner ends thereof being curved to form triggers adapted to engage the upper sides of the said trigger rollers to releasably hold the said tread boards in elevated position.

5. In a device of the kind described, a flat, elongated base; two spaced and parallel trap rings rigidly mounted perpendicularly at one end of the base with their planes parallel to the axis of the base; a connectng strip joining the said rings at their upper portions, the said strip being serrated along its lower edge, and the extended axial line of the strip falling approximately at the opposite end of the said base; a spring set trap arm pivotally attached to the end of the base opposite to the said trap rings, the said trap arm being adapted normally to swing upwardly between the said trap rings and being serrated along its upper edge to cooperate with the said serrated connecting strip of the trap rings.

In testimony whereof I affix my signature.

WILFRID E. DIEGEL.